UNITED STATES PATENT OFFICE.

WILLIAM RUEFF, OF BERKELEY, CALIFORNIA.

PURIFYING AND PRESERVING FRUIT-JUICES.

1,066,153.        Specification of Letters Patent.        Patented July 1, 1913.

No Drawing.        Application filed June 29, 1912. Serial No. 706,636.

*To all whom it may concern:*

Be it known that I, WILLIAM RUEFF, a citizen of the United States, residing at Berkeley, in the county of Alameda and State of California, have invented new and useful Improvements in Purifying and Preserving Fruit-Juices, of which the following is a specification.

My invention relates to a process for purifying and preserving fruit juices after their extraction.

It consists in rendering the fermenting germs contained in such juices inactive by a reduction of temperature in removing the albuminous substances and sediment after condensation and the introduction while cold of an inert gas and the simultaneous removal of the atmospheric air.

Various processes for the preservation of fruit juice, wine, etc., have been practised, in which the aid of heat has been invoked to destroy germs of fermentation and the like. In my invention I use a degree of cold and condensation which I have found produces a better result. The degree of cold which I prefer to use may be from 30° to 40° Fahrenheit. The impurities and sediment are separated and settled by the cooling which acts as is well known in the manufacture of ice to condense and deposit impurities.

In carrying out my process the juice which has been extracted from the fruit is submitted in a proper receptacle to a reduction of temperature, which may be of any desired degree, and this reduction causes a certain amount of condensation which facilitates the settling of any impurities, mucilaginous or other characteristics, which will be separated and settle to the bottom. After a sufficient time has elapsed to allow this settling to be complete, the clear juice may be decanted or otherwise separated from the sediment and it is then subjected to carbonic acid gas under any suitable pressure which is forced into the juice, and the atmospheric air which may be therein contained will be entirely driven out, thus leaving the juice free from oxygen or any fermenting agent. The juice thus purified may be preserved indefinitely in air-tight vessels without any danger of fermenting or any other action taking place.

Having thus described my invention, what I claim and desire to secure by Letters Patent is—

The method herein described of purifying and preserving fruit juice, said method consisting in first subjecting the juice to a temperature sufficiently low to separate and render the impurities indissoluble, decanting or otherwise removing the clear juice from the separated impurities after said separation, then depriving the juice of atmospheric air, and finally introducing an inert gas to take the place of said air.

In testimony whereof I have hereunto set my hand in the presence of two subscribing witnesses.

WILLIAM RUEFF.

Witnesses:
     JOHN H. HERRING,
     GENEVIEVE S. DONELIN.